United States Patent
Moens et al.

(12) 
(10) Patent No.: US 6,380,279 B1
(45) Date of Patent: Apr. 30, 2002

(54) POWDER COMPOSITIONS WITH SEMICRYSTALLINE POLYESTER AND AMORPHOUS POLYESTER BASE CONTAINING TERMINAL METHACRYLOYL GROUPS

(75) Inventors: Luc Moens, Sint-Genesius-Rode; Jean-Marie Loutz; Daniel Maetens, both of Brussels; Patrick Loosen, Ruisbrooek; Marc Van Kerckhove, Nil-Saint-Vincent, all of (BE)

(73) Assignee: UCB S.A., Brussels (BE)

( * ) Notice: Subject to any disclaimer, the term of this patent is extended or adjusted under 35 U.S.C. 154(b) by 0 days.

(21) Appl. No.: 09/284,879
(22) PCT Filed: Oct. 24, 1997
(86) PCT No.: PCT/BE97/00124
§ 371 Date: Apr. 17, 2000
§ 102(e) Date: Apr. 17, 2000
(87) PCT Pub. No.: WO98/18862
PCT Pub. Date: May 7, 1998

(30) Foreign Application Priority Data

Oct. 25, 1996 (BE) .............................................. 9600905

(51) Int. Cl.$^7$ ................................................. C08F 2/48
(52) U.S. Cl. ....................... 522/111; 522/104; 522/109; 522/179; 522/182; 525/165; 525/168; 525/170; 427/512; 427/508; 428/480; 428/482
(58) Field of Search ............................... 525/32.1, 32.2, 525/36, 165, 168, 170; 428/480, 482; 522/109, 110, 111, 112, 104, 179, 182; 427/508, 512, 27

(56) References Cited

U.S. PATENT DOCUMENTS

| | | | | | |
|---|---|---|---|---|---|
| 3,974,303 | A | * | 8/1976 | Iwase et al. | 427/27 |
| 4,820,745 | A | * | 4/1989 | Muller et al. | 522/90 |
| 4,822,829 | A | * | 4/1989 | Muller et al. | 522/90 |
| 5,360,863 | A | * | 11/1994 | Meixner et al. | 525/28 |
| 5,596,037 | A | * | 1/1997 | Moens et al. | 525/539 |
| 5,620,751 | A | * | 4/1997 | Brindoepke et al. | 427/506 |
| 5,639,560 | A | * | 6/1997 | Moens et al. | 428/482 |
| 5,744,248 | A | * | 4/1998 | Meixner et al. | 428/482 |
| 5,763,099 | A | * | 6/1998 | Misev et al. | 428/482 |
| 5,922,473 | A | * | 7/1999 | Muthiah et al. | 428/481 |
| 6,011,080 | A | * | 1/2000 | Daly et al. | 522/107 |

FOREIGN PATENT DOCUMENTS

| | | |
|---|---|---|
| EP | 0408465 | 1/1991 |
| EP | 0624609 | 11/1994 |

* cited by examiner

Primary Examiner—James J. Seidleck
Assistant Examiner—Sanza L. McClendon
(74) Attorney, Agent, or Firm—Finnegan, Henderson, Farabow, Garrett & Dunner, L.L.P.

(57) ABSTRACT

Radiation-curable powder compositions, usable as paint or varnish, which comprise a mixture of at least one semi-crystalline polyester containing end methacryloyl groups and of at least one amorphous polyester containing end methacryloyl groups, comprising the reaction products of a glycidyl methacrylate and of a semi-crystalline or amorphous polyester containing end carboxyl groups.

39 Claims, No Drawings

POWDER COMPOSITIONS WITH SEMICRYSTALLINE POLYESTER AND AMORPHOUS POLYESTER BASE CONTAINING TERMINAL METHACRYLOYL GROUPS

DESCRIPTION

The present invention relates to novel radiation-curable powder compositions comprising a mixture of at least one semi-crystalline polyester containing end methacryloyl groups and of at least one amorphous polyester containing end methacryloyl groups, as well as to the preparation and to the uses of the said compositions.

More particularly, the present invention relates to powder compositions curable by ultraviolet irradiation or by accelerated electron beams, the binder of which is composed of a mixture of at least one semi-crystalline polyester containing end methacryloyl groups and of at least one amorphous polyester containing end methacryloyl groups, and which lend themselves to the production of paint and varnish coatings exhibiting a unique array of properties, inter alia excellent hardness and flexibility, excellent mechanical properties, notable resistance to solvents and to weathering, and good stability on storage.

Heat-curable powder compositions are well known in the state of the art and are widely used as paints and varnishes for coating the most diverse objects. The advantages of these powders are manifold; on the one hand, problems due to solvents are completely eliminated and, on the other hand, the powders are 100% used, insofar as only the powder in direct contact with the substrate is retained by the latter, the excess powder being, in principle, fully recoverable and reusable. This is why these powder compositions are preferred with respect to coating compositions which are provided in the form of solutions in an organic solvent.

Heat-curable powder compositions have already found a wide outlet in the coating of domestic electrical appliances, automobile industry accessories, metal furniture, and the like. They generally contain heat-curable organic compounds which constitute the binder for the paint, fillers, pigments, catalysts and various additives for adapting their behaviour to their use.

Different types of heat-curable powder compositions exist. The most well known compositions contain, as binder, either a mixture of polyesters containing carboxyl groups with epoxide-containing compounds, such as triglycidyl isocyanurate, or β-hydroxyalkylamides, or alternatively a mixture of polyesters containing hydroxyl groups with isocyanates, which are or are not blocked, glycoluril or melamine resins, polycarboxylic acid anhydrides, and the like.

Currently, the great majority of polyesters used in heat-curable powder compositions are amorphous polyesters. Now, when the polyester is amorphous, it is difficult to prepare perfect heat-curable pulverulent compositions because they have to meet often contradictory criteria. Thus, these powders may not reagglomerate during their handling, their transportation and their storage, which implies that the amorphous polyester must possess a sufficiently high glass transition temperature (Tg). On the other hand, in order for the powder particles to be able to coalesce and to form a perfectly homogeneous and uniform coating, it is necessary for the glass transition temperature (Tg) of the polyester to be sufficiently low to ensure a low viscosity in the molten state which, itself, ensures good wetting of the pigments and other solid materials accompanying the polyester in the formulation of the said heat-curable powder compositions.

Moreover, the powder must be capable of melting at the stoving temperature in order to form an even film before the crosslinking reaction begins which results in the final curing. In order to obtain good spreading of the molten film over the surface of the substrate, it is therefore necessary for the viscosity of the polyester in the molten state to be sufficiently low. This is because a very high viscosity in the molten state prevents good spreading of the molten film and is reflected by a loss in the evenness and in the gloss of the coating. Finally, the rate of the crosslinking reaction of the composition can only be controlled by varying the temperature, as well as the amount and/or the nature of the crosslinking agent and of the crosslinking catalyst which is optionally used. Taking into account all the preceding requirements, it is generally accepted that a suitable amorphous polyester must exhibit a glass transition temperature (Tg) which is greater than 50° C. but less than 85° C. and a viscosity in the molten state of between 100 and 10,000 mPa·s, measured at a temperature of 200° C. on a cone/plate viscometer according to ASTM D 4287-88.

For all these reasons, it is not generally recommended to produce coatings from compositions based on such amorphous polyesters by stoving at temperatures below 160° C. for a time of approximately 10 to 20 minutes. In fact, at lower stoving temperatures, coatings of poorer quality having unsatisfactory physical properties are generally obtained. Moreover, the difficulty which is encountered in establishing a glass transition temperature (Tg) which is sufficiently high, in order to eliminate the tendency towards reagglomeration during storage, constitutes a lack of flexibility for the user of the powder.

In order to solve these problems, heat-curable powder compositions have more recently been provided in which the binder is composed of a semi-crystalline polyester containing carboxyl groups or hydroxyl groups. This is because the properties of semi-crystalline polyesters make it possible to overcome, to a large extent, the disadvantages described above which are brought about by the establishment of the glass transition temperature (Tg), of the viscosity in the molten state and of the reactivity of the amorphous polyesters.

Semi-crystalline polyesters generally have a melting point greater than 40° C. and a low glass transition temperature (Tg) generally of less than 30° C. This has the consequence that the viscosity in the molten state of semi-crystalline polyesters is much less than that of amorphous polyesters of comparable molecular weight commonly used in heat-curable powder compositions.

Heat-curable compositions based on semi-crystalline polyesters have already formed the subject of a certain number of publications in the form of papers and patents. In the patent literature, mention will in particular be made of International Patent Application PCT WO 91/14745, European Patent Application 70.118 and U.S. Pat. Nos. 4,352,924, 4,387,214, 4,937,288 and 4,973,646.

Semi-crystalline polyesters and the heat-curable powder compositions prepared from the latter therefore possess, on the whole, properties which are more advantageous than those of amorphous polyesters. However, in spite of their advantageous properties, the semi-crystalline polyesters of the state of the art also exhibit significant disadvantages on an industrial scale, even if these semi-crystalline polyesters are used as an additional component for modifying commercially available conventional amorphous polyesters.

Firstly, the coatings obtained from such compositions containing semi-crystalline polyesters exhibit a low surface hardness (HB pencil hardness). This defect of semi-crystalline polyesters greatly restricts the technical applications of the compositions containing these polyesters.

Secondly, in order to be curable at a moderate temperature, generally at least 150° C., polyesters require the presence of a crosslinking agent (epoxide-containing compounds, β-hydroxyalkylamides, and the like) and of a catalyst. Now, for the preparation of the powder, the polyester must be melted with the crosslinking agent, the catalyst and the other additives in an extruder at a temperature in the region of the crosslinking temperature of the system. It follows that, without specific precautions, an undesirable premature crosslinking of the binder, by reaction between the polyester and the crosslinking agent, already takes place during the preparation of the powder. A powder thus prepared produces defective coatings because of the presence of gelled particles and because, at the time when the molten film has to be spread over the surface of the substrate to be coated, instead of decreasing under the effect of heat, its viscosity increases too rapidly, by premature crosslinking, to obtain good spreading, which results in malformations of the coating obtained, such as orange peel and the like.

In addition, premature crosslinking of the binder can, without specific precautions, cause blocking of the extruder, which presents a not insignificant real danger.

Attempts have already been made to develop binders containing end methacryloyl groups for the manufacture of powder varnishes and paints which do not require the presence of a crosslinking agent; they are binders which are curable by ultraviolet irradiation or by accelerated electron beams.

U.S. Pat. No. 3,974,303 describes such compositions containing, as binders, very diverse thermoplastic resins. However, the sole polyester described in this patent (Example 3) is an amorphous polyester which has a glass transition temperature below room temperature (2.5° C.). The compositions prepared from this polyester consequently do not exhibit the least stability on storage and are of no practical use.

Consequently, it is highly desirable to be able to have available novel binders for the manufacture of powder compositions which can be cured by ultraviolet irradiation or by accelerated electron beams and which no longer exhibit the disadvantages recalled above, due to the fact that the mechanism of crosslinking is no longer concomitant with that of melting of the powder. Such binders should make it possible to prepare powder compositions which can be cured at low temperatures, for example 100 to 150° C., and which can be rapidly melted, as during short periods of 1 to 5 minutes, before irradiation. In addition, these compositions should exhibit good stability on storage and ensure, at the same time, production of paint or varnish coatings possessing excellent properties, in particular as regards the fluidity in the molten state, the surface appearance, the surface hardness, the flexibility, the mechanical properties, the resistance to solvents and the resistance to weathering.

The surprising discovery has now been made that this objective is achieved when, for the preparation of radiation-curable powder compositions, use is made, as binder, of a mixture of semi-crystalline polyesters containing end methacryloyl groups and of amorphous polyesters containing end methacryloyl groups. These polyesters are prepared from a glycidyl methacrylate and from semi-crystalline or amorphous polyesters, themselves prepared from specific acid and alcohol constituents.

The subject of the present invention is therefore novel radiation-curable powder compositions comprising a mixture of at least one semi-crystalline polyester containing end methacryloyl groups and at least one amorphous polyester containing end methacryloyl groups, these polyesters comprising the reaction products of a glycidyl methacrylate and of a semi-crystalline or amorphous polyester containing end carboxyl groups, the said semi-crystalline polyester containing end carboxyl groups being chosen from (a) a polyester which is the reaction product of
(1) an acid constituent which contains (a.1.1) 85 to 100 mol % of terephthalic acid, of 1,4-cyclohexanedicarboxylic acid or of 1,12-dodecanedioic acid and (a.1.2) 0 to 15 mol % of at least one other aliphatic, cycloaliphatic or aromatic di- or polycarboxylic acid having from 4 to 14 carbon atoms; with,
(2) an alcohol constituent which contains (a.2.1) 85 to 100 mol % of a saturated, straight-chain, aliphatic diol having from 2 to 12 carbon atoms and (a.2.2) 0 to 15 mol % of at least one other aliphatic or cycloaliphatic di- or polyol having from 2 to 15 carbon atoms; and (b) a polyester which is the reaction product of
(1) an acid constituent which contains (b.1.1) 85 to 100 mol % of a saturated, straight-chain, aliphatic dicarboxylic acid having from 4 to 14 carbon atoms and (b.1.2) 0 to 15 mol % of at least one other aliphatic, cycloaliphatic or aromatic di- or polycarboxylic acid having from 4 to 14 carbon atoms; with,
(2) an alcohol constituent which contains (b.2.1) 85 to 100 mol % of 1,4-cyclohexanediol or of 1,4-cyclohexanedimethanol and (b.2.2) 0 to 15 mol % of at least one other aliphatic or cycloaliphatic di- or polyol having from 2 to 15 carbon atoms;

and the said amorphous polyester containing end carboxyl groups being composed of the (c) reaction product of
(1) an acid constituent which contains (c.1.1) 40 to 100 mol % of terephthalic acid or of isophthalic acid and (c.1.2) 0 to 60 mol % of another aliphatic, cycloaliphatic or aromatic di- or polycarboxylic acid having from 4 to 14 carbon atoms, with
(2) an alcohol constituent which contains (c.2.1) 35 to 100 mol % of neopentyl glycol and (c.2.2) 0 to 65 mol % of another aliphatic or cycloaliphatic di- or polyol having from 2 to 15 carbon atoms.

Preferably, the acid constituent (c.1.1) contains 80 to 100 mol % of terephthalic acid or of isophthalic acid and the constituent (c.1.2) 0 to 20 mol % of another aliphatic, cycloaliphatic or aromatic di- or polycarboxylic acid having from 4 to 14 carbon atoms. Preferably again, the alcohol constituent (c.2.1) contains 60 to 100 mol % of neopentyl glycol and the constituent (c.2.2) 0 to 40 mol % of another aliphatic or cycloaliphatic di- or polyol having from 2 to 15 carbon atoms.

The semi-crystalline polyesters containing end methacryloyl groups incorporated in the compositions in accordance with the present invention exhibit a degree of end methacrylic unsaturation of 0.17 to 2.0, preferably of 0.35 to 1.50, milliequivalents of double bonds per gram of polyester.

In addition, these semi-crystalline polyesters containing end methacryloyl groups exhibit the following characteristics:

a number-average molecular weight of between 1000 and 20,000, preferably between 1400 and 8500, measured by gel permeation chromatography (or GPC), a well-defined melting point of approximately 60 to 150° C., determined by differential scanning calorimetry (or DSC) according to ASTM standard D 3418-82, a viscosity of less than or equal to 10,000 mPa·s at 175° C., measured by the cone/plate method (ICI viscosity) according to ASTM standard D 4287-88.

The acid constituent of the semi-crystalline polyester (a) containing end carboxyl groups contains 85 to 100 mol % of terephthalic acid, of 1,4-cyclohexanedicarboxylic acid or of 1,12-dodecanedioic acid and optionally up to 15 mol % of one or more other aliphatic, cycloaliphatic or aromatic di- or polycarboxylic acids having from 4 to 14 carbon atoms, such as maleic acid, fumaric acid, isophthalic acid, phthalic acid, terephthalic acid, 1,2-cyclohexanedicarboxylic acid, 1,3-cyclohexanedicarboxylic acid, 1,4-cyclohexanedicarboxylic acid, succinic acid, glutaric acid, adipic acid, pimelic acid, suberic acid, azelaic acid and sebacic acid. These acids can be used in the form of the free acid or of their functional derivatives, in particular in the form of the anhydride. The use of a polycarboxylic acid (or its anhydride) containing at least three carboxyl groups, for example trimellitic acid (or the anhydride) or pyromellitic acid, makes possible the preparation of branched polyesters. In addition, these di- or polycarboxylic acids can be used alone or as a mixture but they are preferably used alone.

The alcohol constituent of the semi-crystalline polyester (a) containing end carboxyl groups contains 85 to 100 mol % of a saturated, straight-chain, aliphatic diol having from 2 to 12 carbon atoms. Examples of diols which can be used are ethylene glycol, 1,4-butanediol, 1,5-pentanediol and 1,6-hexanediol. The alcohol constituent of the semi-crystalline polyester (a) containing end carboxyl groups can also contain up to 15 mol % of one or more other aliphatic or cycloaliphatic di- or polyols having from 2 to 15 carbon atoms, such as, for example, 1,4-cyclohexanediol, 1,4-cyclohexanedimethanol or hydrogenated bisphenol A. For the preparation of branched polyesters, use is advantageously made of trihydroxylated or tetrahydroxylated polyols, such as trimethylolpropane, ditrimethylolpropane, trimethylolethane or pentaerythritol and their mixtures.

The acid constituent of the semi-crystalline polyester (b) containing end carboxyl groups contains 85 to 100 mol % of a saturated, straight-chain, aliphatic dicarboxylic acid having from 4 to 14 carbon atoms. Examples of the acids which can be used are succinic acid, glutaric acid, adipic acid, pimelic acid, suberic acid, azelaic acid, sebacic acid, 1,12-dodecanedioic acid, and the like. These acids can be used in the form of free acids or of their functional derivatives, in particular in the form of anhydrides. In addition, these acids can be used alone or as a mixture but they are preferably used alone.

The acid constituent of the semi-crystalline polyester (b) containing end carboxyl groups can also contain up to 15 mol % of one or more other aliphatic, cycloaliphatic or aromatic di- or polycarboxylic acids having from 4 to 14 carbon atoms, such as maleic acid, fumaric acid, terephthalic acid, phthalic acid, isophthalic acid, 1,2-cyclohexanedicarboxylic acid, 1,3-cyclohexanedicarboxylic acid or 1,4-cyclohexanedicarboxylic acid. The use of a polycarboxylic acid (or its anhydride) containing at least three carboxyl groups, for example trimellitic acid (or the anhydride) or pyromellitic acid, makes possible the preparation of branched polyesters. In addition, these di- or polycarboxylic acids can be used alone or as a mixture but they are preferably used alone.

The alcohol constituent of the semi-crystalline polyester (b) containing end carboxyl groups contains 85 to 100 mol % of 1,4-cyclohexanediol or of 1,4-cyclohexanedimethanol. The alcohol constituent of the semi-crystalline polyester (b) containing end carboxyl groups can also contain up to 15 mol % of one or more other aliphatic or cycloaliphatic di- or polyols, such as ethylene glycol, propylene glycol, 1,4-butanediol, 1,5-pentanediol, 1,6-hexanediol, 1,4-cyclohexanediol, 1,4-cyclohexanedimethanol and hydrogenated bisphenol A. For the preparation of branched polyesters, use is advantageously made of trihydroxylated or tetrahydroxylated polyols, such as trimethylolpropane, ditrimethylolpropane, trimethylolethane or pentaerythritol and their mixtures.

The amorphous polyesters containing end methacryloyl groups incorporated in the compositions in accordance with the present invention exhibit a degree of end methacrylic unsaturation of 0.17 to 1.5, preferably of 0.35 to 1.25, milliequivalents of double bonds per gram of polyester.

In addition, these amorphous polyesters containing end methacryloyl groups exhibit the following characteristics:

a number-average molecular weight of between 1100 and 9000 approximately, preferably between 1300 and 8500, measured by gel permeation chromatography (or GPC), a glass transition temperature ranging from 45 to 80° C., a functionality of between 2 and 4.

The acid constituent of the amorphous polyester (c) containing carboxyl groups is composed of 40 to 100 mol %, preferably of 80 to 100 mol %, of terephthalic acid or of isophthalic acid, and of 0 to 60 mol %, preferably of 0 to 20 mol %, of another aliphatic, cycloaliphatic or aromatic di- or polycarboxylic acid having from 4 to 14 carbon atoms, such as maleic acid, fumaric acid, tetrahydrophthalic acid, isophthalic acid, phthalic acid, terephthalic acid, 1,2-cyclohexanedicarboxylic acid, 1,3-cyclohexanedicarboxylic acid, 1,4-cyclohexanedicarboxylic acid, succinic acid, glutaric acid, adipic acid, pimelic acid, suberic acid, azelaic acid and sebacic acid. These acids can be used in the form of a free acid of or their functional derivatives, in particular in the form of the anhydride. The use of a polycarboxylic acid (or its anhydride) containing at least three carboxyl groups, for example trimellitic acid (or the anhydride) or pyromellitic acid, makes possible the preparation of branched polyesters. In addition, these di- or polycarboxylic acids can be used alone or as a mixture.

The alcohol constituent of the amorphous polyester (c) containing carboxyl groups is composed of 35 to 100 mol %, preferably of 60 to 100 mol %, of neopentyl glycol and of 0 to 65 mol %, preferably of 0 to 40 mol %, of another aliphatic or cycloaliphatic di- or polyol having from 2 to 15 carbon atoms, such as ethylene glycol, diethylene glycol, 1,4-butanediol, 1,6-hexanediol, propylene glycol, 1,4-cyclohexanediol, 1,4-cyclohexanedimethanol, hydrogenated bisphenol A, 2-ethyl-2-butyl-1,3-propanediol, 2-methyl-1,3-propanediol or neopentyl glycol hydroxypivalate. The use of a polyol containing at least three hydroxyl groups, such as trimethylolpropane, ditrimethylolpropane or pentaerythritol, makes possible the preparation of branched polyesters.

An essential characteristic of the semi-crystalline polyesters and of the amorphous polyesters incorporated in the compositions in accordance with the present invention is that they are composed of chains which virtually all contain crosslinkable methacryloyl groups at each end of the chain. These methacryloyl groups are introduced by reaction of the semi-crystalline or amorphous polyesters containing carboxyl groups with a glycidyl methacrylate, such as glycidyl methacrylate, β-methylglycidyl methacrylate, and the like.

It has been observed that polyesters containing end methacryloyl groups provide compositions showing, under irradiation, a greater rate of curing than polyesters containing unsaturation introduced only by polycarboxylic acids containing ethylenically unsaturated groups, such as are found in maleic acid, fumaric acid, tetrahydrophthalic acid, and the like.

However, according to the invention, the combination of these two types of ethylenic and end methacrylic unsaturation in the chain in these polyesters, and more particularly in the amorphous polyester, provides compositions which give coatings having properties of pencil hardness and of resistance to chemical agents which are even better than those of the coatings obtained from mixtures of semi-crystalline and amorphous polyesters containing only end methacryloyl groups, without ethylenic unsaturation in the polyester chain. The amount of this ethylenic unsaturation in the chain of the amorphous polyesters is from 0 to 3.5, preferably from 0 to 1.0, milliequivalents of double bond per gram of polyester.

In order to be usable in powder compositions, the semi-crystalline polyesters must necessarily meet the following requirements:
  the polyesters must exhibit a sufficiently high degree of crystallinity; the latter will, for example, be greater than or equal to 10 joules/g, preferably 15 joules/g, determined according to ASTM standard D 3418-82; and
  the crystallization time must be sufficiently short.

In order to meet these requirements, it is necessary for the chain of the polyester to be as regular as possible. For this purpose, it is preferable for the acid and alcohol constituents entering into the composition of the semi-crystalline polyester to be straight-chain symmetrical compounds, such as saturated, straight-chain aliphatic diols and saturated, straight-chain dicarboxylic acids, and for these compounds to be used alone rather than as a mixture.

Moreover, it should be noted that the reaction with a glycidyl methacrylate does not affect the semi-crystalline nature of the polyester obtained.

In order to achieve the aims pursued by the present invention, it is therefore necessary in particular to make a judicious choice of the nature of the acid and alcohol constituents entering into the composition of the polyesters in order to provide the desired degree of crystallinity of the latter.

By virtue of the semi-crystalline nature of the polyesters used in the compositions according to the present invention, the powders exhibit very good stability on storage and coatings can be obtained at low application temperatures of the order of 100 to 150° C. It is also obvious that the lowering of the application temperature is economically advantageous, since it results in a saving in energy. Another not insignificant advantage is that it is possible to obtain coatings on substrates which are more sensitive to heat, such as, for example, wood and plastics, thus widening the field of application of products of this type.

However, with respect to known semi-crystalline polyesters, which do not contain end methacryloyl groups, the semi-crystalline polyesters containing end methacryloyl groups which are incorporated in the powder compositions in accordance with the invention also exhibit a series of additional, very important advantages.

As has already been explained in the introduction to the present specification, in order that they may be cured under the effect of heat at low temperature, known semi-crystalline polyesters, used alone or as a mixture, require the presence of a crosslinking agent and of a catalyst with, as a consequence, the formation of defective coatings (gelled particles and orange peel).

The essential advantage of the powder compositions comprising a mixture of semi-crystalline polyesters and of amorphous polyesters in accordance with the invention is that they can be cured at low temperature, without either an additional crosslinking agent or a catalyst, by ultraviolet irradiation or by accelerated electron beams, after a very short period of time in the molten state, ranging from 1 to 5 minutes.

This makes it possible to overcome, to a large extent, the disadvantages described above which the presence of a crosslinking agent and of a catalyst introduces into the crosslinking and into the curing under the effect of heat.

This is because, in view of the absence of crosslinking agent, any premature reaction with the latter is excluded during the preparation of the powder in the extruder and in particular at the time when the molten film has to be spread over the surface of the substrate to be coated. The viscosity which is suitable for providing perfect spreading of the molten film, given that the crosslinking resulting in the curing of the molten film only begins at the time of the exposure of the latter to ultraviolet radiation or to accelerated electron beams, can consequently easily be obtained. These advantages are reflected in reality by the production of very taut coatings having a smooth appearance and without apparent defects.

Another advantage of the powder compositions comprising a mixture of semi-crystalline polyesters and of amorphous polyesters in accordance with the invention, as will be shown in the following examples, is that they provide, after curing by radiation, coatings which exhibit very good flexibility, at the same time as good surface hardness.

The radiation-curable powder compositions in accordance with the invention comprising a mixture of at least one semi-crystalline polyester containing end methacryloyl groups and an amorphous polyester containing end methacryloyl groups preferably contain from 40 to 100 parts by weight of semi-crystalline and amorphous polyesters containing end methacryloyl groups per 100 parts of the composition. In addition to the polyesters containing end methacryloyl groups, these compositions optionally contain a photoinitiator and the various additional substances conventionally used in the manufacture of powder paints and varnishes. These compositions preferably contain 5 to 50 parts by weight and more particularly 5 to 35 parts by weight of the semi-crystalline polyester containing end methacryloyl groups, besides 50 to 95 parts by weight and preferably 65 to 95 parts by weight of the amorphous polyester containing end metacryloyl groups, with respect to the combined weight of the polyesters.

In addition, according to an alternative form of the embodiment of the invention, the radiation-curable powder compositions also comprise an ethylenically unsaturated oligomer. Mention will be made, as examples of these ethylenically unsaturated oligomers, of the triacrylate and the trimethacrylate of tris(2-hydroxyethyl)isocyanurate, the epoxy acrylates and methacrylates which are formed by reaction of an epoxy compound (for example, the diglycidyl ether of bisphenol A) with acrylic or methacrylic acid, the urethane acrylates and methacrylates which are formed by reaction of an organic di- or polyisocyanate with a hydroxyalkyl acrylate or a hydroxyalkyl methacrylate and optionally a mono- and/or polyhydroxylated alcohol (for example, the reaction product of hydroxyethyl acrylate or methacrylate with toluene diisocyanate or isophorone diisocyanate), acrylic acrylates or methacrylates, such as, for example, the reaction product of acrylic or methacrylic acid with a copolymer containing glycidyl groups obtained by copolymerization of acrylic monomers, such as n-butyl methacrylate and methyl methacrylate, with glycidyl acrylate or methacrylate, and the like. The triacrylate of tris(2-hydroxyethyl)isocyanurate is preferably used. As these ethylenically unsaturated oligomers contain polymerizable double bonds, they also participate in the radiation curing and can consequently provide coatings with a surface hardness which is further increased. Depending upon the applications envisaged, the compositions in accordance with the invention contain 0 to 20, preferably 0 to 10, parts by weight of ethylenically unsaturated oligomer per 100 parts of composition in accordance with the invention.

In order to prepare the semi-crystalline or amorphous polyesters containing end methacryloyl groups, the preparation is first carried out of a polyester containing end carboxyl groups, with a straight or branched chain, and the polyester containing end carboxyl groups thus prepared is then reacted with glycidyl methacrylate or β-methylglycidyl methacrylate.

The semi-crystalline or amorphous polyester containing end carboxyl groups is prepared according to the conventional methods for the synthesis of polyesters by esterification in one or more stages.

If the semi-crystalline or amorphous polyester containing end carboxyl groups is obtained in one stage, a stoichiometric excess of one or more appropriate di- or polycarboxylic acids and one or more appropriate diols or polyols are reacted together.

In order to obtain a semi-crystalline or amorphous polyester containing end carboxyl groups in two stages, a polyester containing end hydroxyl groups is first prepared from one or more appropriate di- or polycarboxylic acids and from a stoichiometric excess of one or more appropriate diols or polyols and the polyester containing end hydroxyl groups thus obtained is then esterified with one or more other appropriate di- or polycarboxylic acids in order to obtain a semi-crystalline or amorphous polyester containing end carboxyl groups.

For the preparation of the semi-crystalline or amorphous polyesters containing end carboxyl groups, use is generally made of a conventional reactor equipped with a stirrer, an inert gas (nitrogen) inlet, a distillation column connected to a water-cooled condenser and a thermometer connected to a thermoregulator.

The esterification conditions used for the preparation of these polyesters are conventional, namely that it is possible to use an ordinary esterification catalyst derived from tin, such as dibutyltin oxide, dibutyltin dilaurate or n-butyltin trioctoate, or derived from titanium, such as tetrabutyl titanate, in the proportion of 0 to 1% by weight of the reactants, and optionally to add antioxidants, such as the phenol compounds Irganox 1010 (Ciba-Geigy) or Ionol CP (Shell), alone or stabilizers of phosphonite or phosphite type, such as tributyl phosphite or triphenyl phosphite, in the proportion of 0 to 1% by weight of the reactants.

The polyesterification is generally carried out at a temperature which is gradually increased from 130° C. to approximately 180 to 250° C., first at normal pressure and then under reduced pressure at the end of each stage of the process, these conditions being maintained until a polyester is obtained which exhibits the desired hydroxyl number and/or acid number. The degree of esterification is monitored by determination of the amount of water formed during the reaction and of the properties of the polyester obtained, for example the hydroxyl number, the acid number, the molecular weight and/or the viscosity.

The semi-crystalline polyesters containing carboxyl groups thus obtained exhibit the following characteristics:

an acid number of 10 to 150 mg of KOH/g, preferably of 20 to 100 mg of KOH/g, a number-average molecular weight of between 800 and 20,000, preferably between 1000 and 8500, a well-defined melting point of approximately 60 to 150° C., determined by differential scanning calorimetry (or DSC) according to ASTM standard D 3418-82, a viscosity in the molten state of less than 10,000 mPa·s, measured at 175° C. with a cone/plate viscometer (known under the name of "ICI viscosity") according to ASTM standard D 4287-88, and a functionality which is, preferably, between 2 and 3.

The amorphous polyesters containing carboxyl groups thus obtained exhibit the following characteristics:

an acid number of 10 to 100 mg of KOH/g, preferably of 20 to 70 mg of KOH/g, a number-average molecular weight of between 800 and 9000, preferably from 1000 to 8500, a functionality which is preferably between 2 and 4, a glass transition temperature of between 45 and 85° C., a degree of ethylenic unsaturation in the chain of the polyester of 0 to 3.5, preferably of 0 to 1.0, milliequivalent of double bond per gram of polyester.

The semi-crystalline polyesters containing methacryloyl groups and the amorphous polyesters containing methacryloyl groups are prepared in the following way. On completion of the polycondensation, the polyester, in the molten state, which is found in the reactor described above, is allowed to cool to a temperature of between 100 and 160° C., and the polymerization inhibitor and then, slowly, a substantially equivalent amount of glycidyl methacrylate or of β-methylglycidyl methacrylate are added thereto.

The operating conditions used for the preparation of the semi-crystalline or amorphous polyesters containing end methacryloyl groups are also conventional, namely that it is possible to use a catalyst for the acid/epoxy reaction, for example amine-containing derivatives, such as 2-phenylimidazoline, phosphines, such as triphenylphosphine, quaternary ammonium compounds, such as tetrapropylammonium chloride or tetrabutylammonium bromide, or phosphonium salts, such as ethyltriphenylphosphonium bromide or benzyltriphenylphosphonium chloride, or chromium-based catalysts, in the proportion of 0.01 to 1.0% by weight of the reactants, and to add radical polymerization inhibitors, such as phenothiazine, or an inhibitor of hydroquinone type, in the proportion of 0.01 to 1.0% by weight of the reactants.

The addition reaction is generally carried out at a temperature of between 100 and 160° C. The degree of progression of the reaction is monitored by determination of the properties of the polyester obtained, for example the hydroxyl number, the acid number, the degree of end unsaturation and/or the content of residual epoxy groups.

The mixtures of the semi-crystalline polyesters containing end methacryloyl groups and of the amorphous polyesters containing end methacryloyl groups described above are intended to be used as binders in the preparation of powder compositions curable by ultraviolet irradiation or by accelerated electron beams, it being possible for the said compositions to be used in particular as varnishes and paints which lend themselves to application according to the technique of deposition by means of a triboelectric or electrostatic spray gun or according to the technique of deposition in a fluidized bed.

This is why the present invention additionally relates to the use of the radiation-curable powder compositions in accordance with the invention for the preparation of powder varnishes, and paints, as well as to the powder varnishes and paints obtained using these compositions.

Finally, the present invention also relates to a process for coating an article which is characterized by the application to the said article of a radiation-curable powder composition in accordance with the invention by deposition by spraying with a triboelectric or electrostatic gun or by deposition in a fluidized bed, followed by the melting of the coating thus obtained by heating at a temperature of 100 to 150° C. for a time of approximately 1 to 5 minutes and by the curing of the coating in the molten state by ultraviolet irradiation or by accelerated electron beams.

For the radiation curing of the powder compositions in accordance with the invention with accelerated electron beams, it is not necessary to use a photoinitiator, seeing that this type of radiation provides by itself alone a production of free radicals which is sufficiently high for the curing to be extremely rapid. In contrast, when it concerns the photocuring of the powder compositions in accordance with the invention with radiation where the wavelengths are between 170 and 600 nanometres (UV radiation), the presence of at least one photoinitiator is essential.

The photoinitiators which can be used according to the present invention are chosen from those commonly used for this purpose.

The appropriate photoinitiators which can be used are aromatic carbonyl compounds, such as benzophenone and its alkylated or halogenated derivatives, anthraquinone and its derivatives, thioxanthone and its derivatives, benzoin ethers, aromatic or non-aromatic alpha-diones, benzil dialkyl acetals, acetophenone derivatives and phosphine oxides.

Photoinitiators which may be suitable are, for example, 2,2'-diethoxyacetophenone, 2-, 3- or 4-bromoacetophenone, 2,3-pentanedione, hydroxycyclohexyl phenyl ketone, benzaldehyde, benzoin, benzophenone, 9,10-dibromoanthracene, 2-hydroxy-2-methyl-1-phenylpropan-1-one, 4,4'-dichlorobenzophenone, xanthone, thioxanthone, benzil dimethyl ketal, diphenyl(2,4,6-trimethylbenzoyl) phosphine oxide, and the like. It may optionally be advantageous to use a photoactivator, such as tributylamine, 2-(2-aminoethylamino)ethanol, cyclohexylamine, diphenylamine, tribenzylamine or aminoacrylates, such as, for example, the addition product of a secondary amine, such as dimethylamine, diethylamine, diethanolamine, and the like, with a polyol polyacrylate, such as the diacrylate of trimethylolpropane, of 1,6-hexenediol, and the like.

The powder compositions in accordance with the invention contain 0 to 15 and preferably 1.5 to 8 parts by weight of photoinitiators per 100 parts by weight of composition in accordance with the invention.

The radiation-curable powder compositions in accordance with the invention can also contain various additional substances conventionally used in the manufacture of powder paints and varnishes.

The additional substances optionally added to the radiation-curable powder compositions in accordance with the invention are, inter alia, compounds which absorb ultraviolet radiation, such as Tinuvin 900 (from Ciba-Geigy Corp.), light stabilizers based on sterically hindered amines (for example Tinuvin 144 from Ciba-Geigy Corp.), fluidity-regulating agents, such as Resiflow PV5 (from Worlee), Modaflow (from Monsanto), Acronal 4F (from BASF) or Crylcoat 109 (from UCB), degassing agents, such as benzoin, and the like.

A variety of pigments and of inorganic fillers can also be added to the radiation-curable powder compositions in accordance with the invention. Mention will be made, as examples of pigments and of fillers, of metal oxides, such as titanium dioxide, iron oxide, zinc oxide, and the like, metal hydroxides, metal powders, sulphides, sulphates, carbonates, silicates, such as, for example, aluminium silicate, carbon black, talc, kaolins, barytas, iron blues, lead blues, organic reds, organic maroons, and the like.

These additional substances are used in the usual amounts, it being understood that if the radiation-curable compositions in accordance with the invention are used as varnishes, the addition of additional substances having opacifying properties will be omitted.

For the preparation of the radiation-curable powder compositions, the semi-crystalline polyester containing end methacryloyl groups, the amorphous polyester containing end methacryloyl groups and optionally the photoinitiator, and the various additional substances conventionally used for the manufacture of powder paints and varnishes, are dry mixed, for example in a tumbling mixer. It is also possible to begin by mixing the semi-crystalline polyester and the amorphous polyester in the molten state and then to mix these two with the other constituents of the powder. The mixture is then homogenized at a temperature lying within the range from 70 to 150° C. in an extruder, for example a Buss Ko-Kneter single-screw extruder or a twin-screw extruder of Werner-Pfleiderer, APV-Baker or Prism type. The extrudate is then allowed to cool, is ground and is sieved in order to obtain a powder in which the size of the particles is between 10 and 150 micrometers.

Instead of the above method, it is also possible to dissolve the semi-crystalline polyester and the amorphous polyester containing end methacryloyl groups, and optionally the photoinitiator, and the various additional substances, in a solvent, such as dichloromethane, to grind in order to obtain a homogeneous suspension containing approximately 30% by weight of solid matter and subsequently to evaporate the solvent, for example by spray drying at a temperature of approximately 50° C., according to methods known per se.

The powder paints and varnishes thus obtained are entirely suitable for application to the article to be coated by conventional techniques, that is to say by the well-known technique of deposition in a fluidized bed or by application with a triboelectric or electrostatic spray gun.

After having been applied to the article concerned, the coatings deposited are heated in a forced circulation oven or by means of infrared lamps at a temperature of 100 to 150° C. for a time of approximately 1 to 5 minutes for the purpose of obtaining the melting and the spreading of the powder particles as a smooth, uniform and continuous coating at the surface of the said article. The molten coating is then cured by radiation, such as the ultraviolet light emitted, for example, by medium-pressure mercury vapour UV radiators, of at least 80 to 240 W/linear cm, or by any other well-known source of the state of the art, at a distance of approximately 5 to 20 cm and for a time of 1 to 20 seconds.

The molten coating can also be cured with accelerated electron beams of at least 150 KeV, the power of the devices employed being a direct function of the thickness of the composition layer to be cured by polymerization.

The radiation-curable powder compositions in accordance with the invention can be applied to the most diverse substrates, such as, for example, paper, cardboard, wood, textiles, metals of different nature, plastics, such as polycarbonates, poly(meth)acrylates, polyolefins, polystyrenes, poly(vinyl chloride)s, polyesters, polyurethanes, polyamides, copolymers such as acrylonitrile-butadiene-styrene (ABS) or cellulose acetate butyrate, and the like.

The examples which follow illustrate the invention without limiting it. Except when otherwise indicated, the parts mentioned in the examples are parts by weight.

EXAMPLE 1

Synthesis of a Semi-crystalline Polyester Containing End Methacryloyl Groups in Three Stages 1st Stage 419.2 parts of 1,6-hexanediol and 2.1 parts of n-butyltin trioctoate, as catalyst, are introduced into a four-necked round-bottomed flask equipped with a stirrer, a distillation column connected to a water-cooled condenser, a nitrogen inlet pipe and a thermometer connected to a thermoregulator. The mixture is heated in a nitrogen atmosphere and with stirring to a temperature of approximately 140° C., 545.4 parts of terephthalic acid are then added, still with stirring, and the mixture is gradually heated until the temperature reaches 230° C. After approximately 95% of the theoretical amount of water formed has been collected, a transparent polyester is obtained.

The semi-crystalline polyester containing end hydroxyl groups thus obtained exhibits the following characteristics:

| acid number | 6 mg of KOH/g |
|---|---|
| hydroxyl number | 41 mg of KOH/g |

2nd Stage

The polyester containing end hydroxyl groups obtained in the first stage is allowed to cool to 200° C. and 84.8 parts of isophthalic acid are added thereto. The reaction mixture is then gradually heated to a temperature of 225° C. The reaction mixture is left at this temperature for approximately 2 hours, until the reaction mixture becomes transparent, 0.8 part of tributyl phosphite is added thereto and the pressure is gradually decreased to 50 mm Hg. The reaction is continued for a further 3 hours at 225° C. under reduced pressure.

The semi-crystalline polyester containing end carboxyl groups thus obtained exhibits the following characteristics:

| acid number | 31 mg of KOH/g |
|---|---|
| hydroxyl number | 2 mg of KOH/g |
| ICI viscosity at 175° C. | 2500 mPa.s |

3rd Stage

The polyester containing end carboxyl groups obtained in the second stage is allowed to cool to 150° C. and 0.5 part of di-tert-butylhydroquinone, as polymerization inhibitor, and 4.6 parts of ethyltriphenylphosphonium bromide, as catalyst, are added thereto. 70.3 parts of glycidyl methacrylate are then added thereto slowly in an oxygen atmosphere and with stirring. One hour after the addition has been completed, a semi-crystalline polyester containing end methacryloyl groups is obtained which exhibits the following characteristics:

| acid number | 1 mg of KOH/g |
|---|---|
| hydroxyl number | 28 mg of KOH/g |
| content of end methacrylic unsaturations | 0.5 milliequivalent/g |
| ICI viscosity at 150° C. | 4000 mPa.s |
| melting temperature (determined by differential scanning calorimetry (or DSC) with a rate of heating of 20° C. per minute) | 120° C. |
| $\overline{M}n$ (GPC) | 4020 |

EXAMPLE 2

Synthesis of a Semi-crystalline Polyester Containing End Methacryloyl Groups in Two Stages 1st Stage 152.2 parts of ethylene glycol, 727.1 parts of 1,12-dodecanedioic acid and 2.0 parts of n-butyltin trioctoate, as catalyst, are introduced into a four-necked round-bottomed flask equipped with a stirrer, a distillation column connected to a water-cooled condenser, a nitrogen inlet pipe and a thermometer connected to a thermoregulator. The mixture is heated in a nitrogen atmosphere and with stirring to a temperature of approximately 140° C., at which the water formed begins to distil. The heating is then continued gradually until the reaction mass reaches a temperature of 220° C. When the distillation at atmospheric pressure stops, 0.8 part of tributyl phosphite is added and a vacuum of 50 mm Hg is gradually established. The reaction is continued for a further 3 hours at 220° C. under a pressure of 50 mm Hg.

The semi-crystalline polyester containing end carboxyl groups thus obtained exhibits the following characteristics:

| acid number | 102 mg of KOH/g |
|---|---|
| hydroxyl number | 4 mg of KOH/g |

2nd Stage

The procedure described in the third stage of Example 1 is followed but the polyester containing end carboxyl groups obtained in the first stage is allowed to cool beforehand to a temperature of 140° C.; 3.9 parts of benzyltriphenylphosphonium chloride and 1.2 parts of di-tert-butylhydroquinone are added; 201.1 parts of glycidyl methacrylate are slowly added. The reaction mixture is kept stirring for one hour at 140° C. under oxygen.

A semi-crystalline polyester containing end methacryloyl groups is obtained which exhibits the following characteristics:

| acid number | 1.7 mg of KOH/g |
|---|---|
| hydroxyl number | 78 mg of KOH/g |
| content of end methacrylic unsaturations | 1.4 milliequivalents/g |
| ICI viscosity at 100° C. | 10 mpas |
| melting temperature (DSC; 20° C./min) | 67° C. |
| $\overline{M}n$ (GPC) | 1406 |

EXAMPLE 3

Synthesis of an Amorphous Polyester Containing End Methacryloyl Groups in Three Stages 1st Stage 369.7 parts of neopentyl glycol, 10.2 parts of trimethylolpropane and 1.9 parts of n-butyltin trioctanoate, as catalyst, are introduced into a four-necked round-bottomed flask equipped with a stirrer, a distillation column connected to a water-cooled condenser, a nitrogen inlet pipe and a thermometer connected to a thermoregulator. The mixture is heated in a nitrogen atmosphere and with stirring to a temperature of approximately 140° C., 528.7 parts of terephthalic acid and 27.8 parts of adipic acid are then added, still with stirring, and the mixture is heated to a temperature of 190° C., at which the water formed begins to distil. The heating is then continued gradually until the reaction mass reaches a temperature of 230° C. After approximately 95% of the theoretical amount of water formed has been collected, a transparent polyester is obtained.

The polyester containing end hydroxyl groups thus obtained exhibits the following characteristics:

| acid number | 10 mg of KOH/g |
|---|---|
| hydroxyl number | 51 mg of KOH/g |

2nd Stage

The polyester containing end hydroxyl groups obtained in the first stage is allowed to cool to 200° C. and 94.8 parts of isophthalic acid are added thereto. The reaction mixture is then gradually heated to a temperature of 225° C. The reaction mixture is left at this temperature for approximately 2 hours, until it becomes transparent, 0.9 part of tributyl phosphite is added thereto and then the pressure is gradually decreased to 50 mm Hg. The reaction is continued for a further 3 hours at 225° C. under reduced pressure.

The polyester containing end carboxyl groups thus obtained exhibits the following characteristics:

| acid number | 37 mg of KOH/g |
|---|---|
| hydroxyl number | 2 mg of KOH/g |
| ICI viscosity at 200° C. | 5400 mPa.s |

3rd Stage

The polyester containing end carboxyl groups obtained in the second stage is allowed to cool to 150° C. and 0.5 part of di-tert-butylhydroquinone, as polymerization inhibitor, and 4.5 parts of ethyltriphenylphosphonium bromide, as catalyst, are added thereto. 92.3 parts of β-methylglycidyl methacrylate are then added thereto slowly over approximately 30 minutes in an oxygen atmosphere and with stirring. One hour after the addition has been completed, an amorphous polyester containing end methacryloyl groups is obtained which exhibits the following characteristics:

| acid number | 1 mg of KOH/g |
|---|---|
| hydroxyl number | 39 mg of KOH/g |
| content of end methacrylic unsaturations | 0.6 milliequivalent/g |
| ICI viscosity at 200° C. | 3400 mPa.s |

| Tg (DSC; 20° C./min) | 51° C. |
|---|---|
| $\overline{M}_n$ (GPC) | 4014 |

EXAMPLE 4

Synthesis of an Amorphous Polyester Containing End Methacryloyl Groups in Three Stages 1st Stage 365.8 parts of neopentyl glycol and 1.9 parts of n-butyltin trioctoate, as catalyst, are introduced into a round-bottomed flask as used in Example 3. The mixture is heated in a nitrogen atmosphere and with stirring to a temperature of approximately 140° C., 460.0 parts of terephthalic acid and 24.3 parts of adipic acid are then added, still with stirring, and the mixture is heated to a temperature of 190° C., at which the water formed begins to distil. The heating is then continued gradually until the reaction mass reaches a temperature of 230° C. After approximately 95% of the theoretical amount of water formed has been collected, a transparent polyester is obtained.

The polyester containing end hydroxyl groups thus obtained exhibit the following characteristics:

| acid number | 2 mg of KOH/g |
|---|---|
| hydroxyl number | 63 mg of KOH/g |

2nd Stage

The polyester containing end hydroxyl groups obtained in the first stage is allowed to cool to 200° C. and 159.4 parts of isophthalic acid are added thereto. The reaction mixture is then gradually heated to a temperature of 225° C. The reaction mixture is left at this temperature for approximately two hours, until the reaction mixture becomes transparent, 0.7 part of tributyl phosphite is added thereto, and the pressure is then gradually decreased to 50 mm Hg. The reaction is continued for a further 3 hours at 225° C. under reduced pressure.

The polyester containing end carboxyl groups thus obtained exhibits the following characteristics:

| acid number | 47 mg of KOH/g |
|---|---|
| hydroxyl number | 3 mg of KOH/g |
| ICI viscosity at 200° C. | 3200 mPa.s |

3rd Stage

The polyester containing end carboxyl groups obtained in the second stage is allowed to cool to 150° C. and 0.7 part of di-tert-butylhydroquinone, as polymerization inhibitor, and 4.4 parts of ethyltriphenylphosphonium bromide, as catalyst, are added thereto. 107.4 parts of glycidyl methacrylate are then added thereto slowly over approximately 30 minutes in an oxygen atmosphere and with stirring. One hour after the addition has been completed, an amorphous polyester containing end methacryloyl groups is obtained which exhibits the following characteristics:

| acid number | 1 mg of KOH/g |
|---|---|
| hydroxyl number | 43 mg of KOH/g |

-continued

| | |
|---|---|
| content of end methacrylic unsaturations | 0.8 milliequivalent/g |
| ICI viscosity at 150° C. | 7600 mPa.s |
| glass transition temperature (determined by differential scanning calorimetry (or DSC) with a rate of heating of 20° C. per minute) | 37° C. |
| $\overline{M}n$ (GPC) | 2532 |

EXAMPLE 5

Synthesis of a Semi-crystalline Polyester Containing End Methacryloyl Groups in 2 Stages 1st Stage A mixture of 191.4 parts of ethylene glycol, of 800.6 parts of 1,12-dodecanedioic acid and of 2.2 parts of n-butyltin trioctoate, as catalyst, is reacted according to the complete process described in the first stage of Example 2.

The semi-crystalline polyester containing end carboxyl groups thus obtained exhibits the following characteristics:

| | |
|---|---|
| acid number | 52 mg of KOH/g |
| hydroxyl number | 2 mg of KOH/g |

2nd Stage

The polyester obtained in the 1st stage is allowed to cool to a temperature of 140° C. and 0.7 part of di-tert-butylhydroquinone and 4.4 parts of benzyltriphenyphosphonium chloride are added thereto. 111.8 parts of glycidyl methacrylate are then added slowly to this mixture and the mixture is left stirring for one hour at 140° C. under oxygen. A semi-crystalline polyester containing end methacryloyl groups is obtained which exhibits the following characteristics:

| | |
|---|---|
| acid number | 2.0 mg of KOH/g |
| hydroxyl number | 48 mg of KOH/g |
| content of end methacrylic unsaturations | 0.8 milliequivalent/g |
| ICI viscosity at 100° C. | 150 mPa.s |
| melting temperature (DSC; 20° C./min) | 65° C. |
| $\overline{M}n$ (GPC) | 2530 |

EXAMPLE 6

Synthesis of a Semi-crystalline Polyester Containing End Methacryloyl Groups in 2 Stages 1st Stage A mixture of 502.6 parts of 1,4-cyclohexanedimethanol, 545.4 parts of adipic acid and 2.3 parts of n-butyltin trioctoate, as catalyst, is reacted according to the complete procedure described in the first stage of Example 2.

The semi-crystalline polyester containing end carboxyl groups thus obtained exhibits the following characteristics:

| | |
|---|---|
| acid number | 31 mg of KOH/g |
| hydroxyl number | 2 mg of KOH/g |

2nd Stage

The polyester obtained in the 1st stage is allowed to cool to a temperature of 140° C. and 0.4 part of di-tert-butylhydroquinone and 4.6 parts of benzyltriphenylphosphonium chloride are added thereto. 70.3 parts of glycidyl methacrylate are then added slowly to this mixture and the mixture is left stirring for one hour at 140° C. under oxygen. A semi-crystalline polyester containing end methacryloyl groups is obtained which exhibits the following characteristics:

| | |
|---|---|
| acid number | 1.7 mg of KOH/g |
| hydroxyl number | 30 mg of KOH/g |
| content of end methacrylic unsaturations | 0.5 milliequivalent/g |
| ICI viscosity at 100° C. | 3600 mPa.s |
| melting temperature (DSC; 20° C./min) | 67° C. |
| $\overline{M}n$ (GPC) | 4024 |

EXAMPLE 7

Synthesis of an Amorphous Polyester Containing End Methacryloyl Groups in 2 Stages 1st Stage 372.8 parts of neopentyl glycol, 10.2 parts of trimethylolpropane and 2.3 parts of n-butyltin trioctoate are introduced into the same reactor as in Example 2. The contents of the round-bottomed flask are heated to 140° C. under nitrogen and with stirring and 660.8 parts of isophthalic acid are added thereto. The reaction mixture is brought to 230° C. The water of reaction begins to distil at 190° C. When approximately 95% of the theoretical amount of water has distilled, the prepolymer is transparent. 0.9 part of tributyl phosphite is added thereto, the reactor is gradually placed under a vacuum of 50 mm of mercury and heating of the reaction mixture is continued for 3 hours at 225° C.

The amorphous polyester containing carboxyl groups thus obtained exhibits the following characteristics:

| | |
|---|---|
| acid number | 38 mg of KOH/g |
| hydroxyl number | 3 mg of KOH/g |
| ICI viscosity at 200° C. | 3200 mPa.3 |

2nd Stage

The polyester obtained in the 1st stage is allowed to cool to a temperature of 150° C. and 0.5 part of di-tert-butylhydroquinone and 4.6 parts of ethyltriphenylphosphonium bromide are added thereto. 81.1 parts of glycidyl methacrylate are then added slowly to this mixture over a half-hour and the mixture is left stirring for one hour at 140° C. under oxygen. An amorphous polyester containing end methacryloyl groups is obtained which exhibits the following characteristics:

| | |
|---|---|
| acid number | 1 mg of KOH/g |
| hydroxyl number | 35 mg of KOH/g |
| content of end methacrylic unsaturations | 0.6 milliequivalent/g |
| ICI viscosity at 100° C. | 4600 mPa.s |
| glass transition temperature (DSC; 20° C./min) | 46° C. |
| $\overline{M}n$ (GPC) | 4030. |

EXAMPLE 8

Synthesis of an Amorphous Polyester Containing End Methacryloyl Groups and Ethylenic Unsaturations in the Chain, in 4 Stages 1st Stage The preparation is carried out in the same way as in Example 1, 164.5 parts of neopentyl glycol, 164.5 parts of ethylene glycol, 10.3 parts of trimethylolpropane and 2.1 parts of n-butyltin trioctoate being introduced into the reactor. The contents of the round-bottomed flask are heated to 140° C. under nitrogen and with stirring and 537.3 parts of terephthalic acid are added thereto. The reaction mixture is brought to 230° C. The water of reaction begins to distil at 190° C. When approximately 95% of the theoretical amount of water has distilled, the prepolymer is transparent.

The amorphous polyester containing hydroxyl groups thus obtained exhibits the following characteristics:

| | |
|---|---|
| acid number | 7 mg of KOH/g |
| hydroxyl number | 162 mg of KOH/g |

2nd Stage

The reaction mixture is allowed to cool to 200° C. and 94.8 parts of fumaric acid, 0.4 part of tributyl phosphite and 0.25 part of di-tert-butylhydroquinone are added thereto. After two hours at 200° C., a vacuum of 50 mm of mercury is applied to the reaction mixture and the heating is continued under these conditions for a further hour.

The amorphous polyester containing hydroxyl groups thus obtained exhibits the following characteristics:

| | |
|---|---|
| acid number | 17 mg of KOH/q |
| hydroxyl number | 59 mg of KOH/g |

3rd Stage 96.1 parts of isophthalic acid are added at 200° C. to the polyester obtained in the 2nd stage and the reaction mixture is heated to 215° C. After two hours at 215° C., 0.4 part of tributyl phosphite is added thereto and a vacuum of 50 mm of mercury is applied to the reaction mixture, which becomes transparent; the heating is continued under these conditions for a further three hours.

The amorphous polyester containing carboxyl groups thus obtained exhibits the following characteristics:

| | |
|---|---|
| acid number | 37 mg of KOH/g |
| hydroxyl number | 5 mg of KOH/g |
| ICI viscosity at 200° C. | 4400 mPa.s |

4th Stage

The polyester obtained in the 3rd stage is cooled to 150° C. and 0.25 part of di-tert-butylhydroquinone and 4.6 parts of ethyltriphenylphosphonium bromide are added thereto. 81.1 parts of glycidyl methacrylate are then added slowly to this mixture, over a half-hour, and the mixture is left stirring for one hour at 140° C. under oxygen. An amorphous polyester containing end methacryloyl groups and ethylenic unsaturations in the chain is obtained which exhibits the following characteristics:

| | |
|---|---|
| acid number | 2 mg of KOH/g |
| hydroxyl number | 35 mg of KOH/g |
| content of end methacrylic unsaturations | 0.7 milliequivalent/g |
| content of ethylenic unsaturations in the chain | 0.7 milliequivalent/g |
| ICI viscosity at 200° C. | 2500 mPa.s |
| glass transition temperature (DSC; 20° C./min) | 47° C. |
| $\overline{M}n$ (GPC) | 4013. |

EXAMPLE 9

Synthesis of an Amorphous Polyester Containing End Methacryloyl Groups and Ethylenic Unsaturations in the Chain, in 3 Stages 1st Stage The preparation is carried out in the same way as in Example 1, 185.5 parts of neopentyl glycol, 185.5 parts of ethylene glycol and 2.2 parts of n-butyltin trioctoate being introduced into the reactor. The contents of the round-bottomed flask are heated to 140° C. under nitrogen and with stirring and 430.6 parts of terephthalic acid are added thereto. The reaction mixture is brought to 230° C. The water of reaction begins to distil at 190° C. When approximately 95% of the theoretical amount of water has distilled, the prepolyymer is transparent.

The amorphous polyester containing hydroxyl groups thus obtained exhibits the following characteristics:

| | |
|---|---|
| acid number | 2 mg of KOH/g |
| hydroxyl number | 345 mg of KOH/g |

2nd Stage

The reaction mixture is allowed to cool to 180° C. and 286.6 parts of fumaric acid are added thereto. The reaction mixture is brought to 200° C., where it is maintained for two hours; it is then transparent; 0.9 part of tributyl phosphite and 0.15 part of di-tert-butylhydroquinone are added thereto and a vacuum of 50 mm of mercury is gradually applied. After three hours at 200° C. and under a vacuum of 50 mm of mercury, the amorphous polyester containing carboxyl groups obtained exhibits the following characteristics:

| | |
|---|---|
| acid number | 37 mg of KOH/g |
| hydroxyl number | 6 mg of KOH/g |
| ICI viscosity at 200° C. | 4000 mPa.s |

3rd Stage

The polyester obtained in the 3rd stage is cooled to 150° C. and 0.3 part of di-tert-butylhydroquinone and 4.6 parts of ethyltriphenylphosphonium bromide are added thereto. 80.9 parts of glycidyl methacrylate are then added slowly to this mixture, over a half-hour, and the mixture is left stirring for one hour at 150° C. under oxygen. An amorphous polyester containing end methacryloyl groups and ethylenic unsaturations in the chain is obtained which exhibits the following characteristics:

| acid number | 1 mg of KOH/g |
|---|---|
| hydroxyl number | 38 mg of KOH/g |
| content of end methacrylic unsaturations | 0.6 milliequivalent/g |
| content of ethylenic unsaturations in the chain | 2.4 milliequivalents/g |
| ICI viscosity at 200° C. | 2000 mPa.s |
| glass transition temperature (DSC; 20° C./min) | 45° C. |
| $\overline{M}n$ (GPC) | 3490. |

EXAMPLE 10

Synthesis of an Amorphous Polyester Containing End Methacryloyl Groups in 3 Stages 1st Stage The preparation is carried out in the same way as in Example 1, 347.6 parts of neopentyl glycol, 14.3 parts of trimethylolpropane and 1.9 parts of n-butyltin trioctoate being introduced into the reactor. The contents of the round-bottomed flask are heated to 140° C. under nitrogen and with stirring and 513.2 parts of terephthalic acid are added thereto. The reaction mixture is brought to 230° C. The water of reaction begins to distil at 190° C. When approximately 95% of the theoretical amount of water has distilled, the prepolymer is transparent.

The amorphous polyester containing hydroxyl groups thus obtained exhibits the following characteristics:

| acid number | 4 mg of KOH/g |
|---|---|
| hydroxyl number | 65 mg of KOH/g |

2nd Stage

The reaction mixture is allowed to cool to 200° C. and 133.2 parts of isophthalic acid are added thereto. The reaction mixture is brought to 225° C., where it is maintained for two hours; it is then transparent; 0.9 part of tributyl phosphite is added thereto. After three hours at 225° C. and under a vacuum of 50 mm of mercury, the amorphous polyester containing carboxyl groups obtained exhibits the following characteristics:

| acid number | 47 mg of KOH/g |
|---|---|
| hydroxyl number | 3 mg of KOH/g |
| ICI viscosity at 200° C. | 6500 mPa.s |

3rd Stage

The polyester obtained in the 2nd stage is cooled to 150° C. and 0.7 part of di-tert-butylhydroquinone and 4.4 parts of ethyltriphenylphosphonium bromide are added thereto. 112.1 parts of glycidyl methacrylate are then added slowly to this mixture, over a half-hour, and the mixture is left stirring for one hour at 150° C. under oxygen. An amorphous polyester containing end methacryloyl groups is obtained which exhibits the following characteristics:

| acid number | 1 mg of KOH/g |
|---|---|
| hydroxyl number | 46 mg of KOH/g |
| content of end methacrylic unsaturations | 0.8 milliequivalent/g |
| ICI viscosity at 200° C. | 6000 mPa.s |
| glass transition temperature (DSC; 20° C./min) | 46° C. |
| $\overline{M}n$ (GPC) | 2910. |

EXAMPLE 11

Synthesis of an Amorphous Polyester Containing Only Ethylenic Unsaturations in the Chain (without End Methacryloyl Groups) in 2 Stages 1st Stage The preparation is carried out in the same way as in Example 1, 170.0 parts of neopentyl glycol, 170.0 parts of ethylene glycol and 2.0 parts of n-butyltin trioctoate being introduced into the reactor. The contents of the round-bottomed flask are heated to 140° C. under nitrogen and with stirring and 395.0 parts of terephthalic acid are added thereto. The reaction mixture is brought to 230° C. The water of reaction begins to distil at 190° C. When approximately 95% of the theoretical amount of water has distilled, the prepolymer is transparent.

The amorphous polyester containing hydroxyl groups thus obtained exhibits the following characteristics:

| acid number | 2 mg of KOH/g |
|---|---|
| hydroxyl number | 345 mg of KOH/g |

2nd Stage

The reaction mixture is allowed to cool to 180° C. and 262.6 parts of fumaric acid are added thereto. The reaction mixture is brought to 200° C., where it is maintained for two hours; it is then transparent; 0.8 part of tributyl phosphite and 0.14 part of di-tert-butylhydroquinone are added thereto and a vacuum of 50 mm of mercury is gradually applied. After three hours at 200° C. and under a vacuum of 50 mm of mercury, the amorphous polyester containing carboxyl groups and ethylenic unsaturations in the chain obtained exhibits the following characteristics:

| acid number | 35 mg of KOH/g |
|---|---|
| hydroxyl number | 6 mg of KOH/g |
| content of end methacrylic unsaturations | 0.0 milliequivalent/g |
| content of ethylenic unsaturations in the chain | 2.4 milliequivalents/g |
| ICI viscosity at 200° C. | 4000 mPa.s |
| glass transition temperature (DSC; 20° C./min) | 48° C. |

EXAMPLE 12

Synthesis of a Semi-crystalline Polyester Containing End Methacryloyl Groups in 2 Stages and its Mixture with an Unsaturated Oligomer 1st Stage A mixture of 186.1 parts of ethylene glycol, of 749.9 parts of 1,12-dodecanedioic acid and of 2.19 parts of n-butyltin trioctoate, as catalyst, is reacted according to the complete process described in the first stage of Example 2.

The semi-crystalline polyester containing end carboxyl groups thus obtained exhibits the following characteristics:

| acid number | 35 mg of KOH/g |
|---|---|
| hydroxyl number | 3 mg of KOH/g |

2nd Stage

The polyester obtained in the 1st stage is allowed to cool to a temperature of 140° C. and 0.5 part of di-tert-butylhydroquinone and 4.2 parts of benzyltriphenylphosphonium chloride are added thereto. 73.7 parts of glycidyl methacrylate are then added slowly to this mixture and the mixture is left stirring for one hour at 140° C. under oxygen. A semi-crystalline polyester containing end methacryloyl groups is obtained which exhibits the following characteristics:

| acid number | 1.0 mg of KOH/g |
|---|---|
| hydroxyl number | 33 mg of KOH/g |
| content of end methacrylic unsaturations | 0.6 milliequivalent/g |
| ICI viscosity at 200° C. | 200 mPa.s |
| melting temperature (DSC; 20° C./min) | 70° C. |
| $\overline{M}n$ (GPC) | 3490 |

The polyester obtained in the 2nd stage is cooled to 85° C. and 91 parts of a mixture of pentaerythritol triacrylate and of pentaerythritol tetraacrylate, sold by UCB S.A. under the name of Petia, are added thereto. The mixture is stirred at 85° C. for one hour under oxygen. This mixture contains 91 parts of the polyester per 9 parts of the oligomer.

EXAMPLE 13

Preparation of Powder Coating Compositions, Stability of these Compositions and Properties of the Coatings Obtained after Radiation Curing Three series of powders of different formulation A, B and C are prepared from the semi-crystalline polyesters containing end methacryloyl groups and from the amorphous polyesters containing only end methacryloyl groups, and/or also ethylenic unsaturations in the chain, obtained in Examples 1 to 12. In these formulations, the parts by weight of the combined polyesters employed are reported. The number of the synthesis example and the proportion of each polyester employed, with respect to the combined polyesters, are indicated in Table II:

| A) | Semi-crystalline polyester and/or amorphous polyester | 96.65 parts |
|---|---|---|
| | Photoinitiator (Irgacure 1800 from the company Ciba-Geigy) | 2.50 parts |
| | Fluidity-regulating agent (Byk 356) | 0.5 part |
| | Degassing agent (Benzoin) | 0.35 part |
| B) | Semi-crystalline polyester and amorphous polyester | 69.40 parts |
| | Titanium dioxide (Kronos CL 2310) | 29.75 parts |
| | Fluidity-regulating agent (Byk 356) | 0.5 part |
| | Degassing agent (Benzoin) | 0.35 part |
| C) | Semi-crystalline polyester and/or amorphous polyester | 72.49 parts |
| | Photoinitiator (mixutre of Irgacure 2959 and of Irgacure 819, Ciba-Geigy, in a ratio by weight of 1/1) | 2.50 parts |
| | Titanium dioxide (Kronos CL 2310) | 24.16 parts |
| | Fluidity-regulating agent (Byk 356) | 0.5 part |
| | Degassing agent (Benzoin) | 0.35 part |

These powder compositions are prepared by dry mixing the polyesters and, for the formulations A and C, the photoinitiators with the various additional substances conventionally used for the manufacture of powder paints and varnishes. The mixture obtained is homogenized at a temperature of approximately 80 to 100° C., in a 16 mm Prism twin-screw extruder, with L/D=15/1, and the extrudate is cooled and ground in a Retsch ZM 100 grinder, with a mesh size of 0.5 mm. To complete, the powder is sieved in order to obtain a size of the particles of between 20 and 100 micrometers.

A portion of the powders is subjected to the stability test. In order to carry out this test, 25 g of powder are placed in a 100 ml container. The container is placed in a water bath, so that it is immersed in the water up to ¾ of its height.

The test begins on day No. 1, the water in the bath being placed at 38° C. The agglomeration of the powder is evaluated after 24 hours and for 5 consecutive days, the temperature being increased according to Table I.

TABLE I

| | T° C. | Evaluation |
|---|---|---|
| day 1 | 38 | day 2 |
| day 2 | 40 | day 3 |
| day 3 | 42 | day 4 |
| day 4 | 45 | day 5 |

A grading of between 5 (excellent) and 0 (very bad) is given to the powders each day, according to the following scale:

5: excellent, the powder is fluid and problem-free;
4: good, the powder is fluid with a slight movement of the hand;
3: acceptable, the powder is fluid with a movement of the hand but a few small agglomerates are present;
2: bad, the powder can only be fluidized with problems, many agglomerates being present;
0: very bad, the powder cannot be fluidized.

On the last day of the test period, a grading with respect to the agglomeration of the powder is given:

++: no agglomerates are present;
+: a few small agglomerates are present, which can be reduced to powder by a slight pressure;
+−: larger agglomerates are present, which can be reduced to powder by a slight pressure;
−: fairly hard agglomerates;
−−: hard agglomerates;
−−−: a lump has formed.

The results are listed in Table II.

Another portion of the powders formulated as described above is applied by means of an electrostatic spray gun at a voltage of 70 kV to untreated cold-rolled steel panels at a film thickness of 50 to 70 micrometers.

The coatings of formulation A and C deposited are then subjected to melting by means of medium-wavelength infrared radiation (Hereaus carbon IR emitter, with an irradiation density of 80 kW/m²) at a temperature of 130° C. for a time of approximately 4 minutes. The coatings in the molten state obtained with the powders are then subjected to irradiation with the ultraviolet light emitted by 100 W/cm medium-pressure mercury vapour UV lamps (DQ 1023 from the company Heraeus Instruments GmbH), at a distance of 15 cm and for a time of 2 seconds.

The coatings of formulation B are melted by IR in the same way as the coatings of formulation A but at a temperature of 200° C. for 30 seconds, followed by 3 minutes at 120° C. The coatings are then subjected, under a nitrogen atmosphere, to a beam of accelerated electrons produced by a 170 KeV linear cathode (from the company Energy Sciences Inc.).

The cured coatings thus obtained are subjected to conventional tests. The results obtained are reported in Table II, in which

- the first column identifies the composition tested;
- the second column, the type of formulation used;
- the third column, the number of the example of the synthesis of the semi-crystalline polyester carrying end methacryloyl groups and its amount as % by weight with respect to the combined weight of the polyesters;
- the fourth column, the number of the example of the synthesis of the amorphous polyester carrying only end methacryloyl groups, and/or also ethylenic insaturation in the chain, and its amount as % by weight with respect to the combined weight of the polyesters;
- the fifth column, the value of the resistance to direct impact, in kg·cm, according to ASTM standard D2795;
- the sixth column, the value of the resistance to reverse impact, in kg·cm, according to ASTM standard D2795;
- the seventh column, the value of the pencil hardness at an angle of 45°, with a force of 7.5 newtons, measured according to ASTM standard D3363-92A;
- the eighth column, the resistance to methyl ethyl ketone, which corresponds to the number of twofold rubbing movements (to and fro) with a cotton wool pad impregnated with methyl ethyl ketone which does not detrimentally affect the appearance of the surface of the cured film;
- the ninth column, a visual assessment of the coating, according to which "good" means that the cured coating possesses a smooth and glossy appearance, without apparent defects such as craters, pinholes and the like, "medium" means that the cured coating exhibits a slight orange peel with a gloss, measured at an angle of 60°, which is less than 90%; and
- the tenth column, the stability on storage, evaluated as explained above.

These results clearly show that the powder compositions in accordance with the invention (compositions (a) to (c), (f), (h) to (j), (l), (m), (o) and (p)) based on a mixture of a semi-crystalline polyester containing end methacryloyl groups and of an amorphous polyester containing end methacryloyl groups, optionally with ethylenic unsaturations in the chain (compositions (l) to (n) and (p)), give paint and varnish coatings which possess excellent characteristics. In fact, these coatings exhibit a hardness reaching a value of 1H, and even 3H (compositions (m) and (p)), a notable flexibility which is reflected by a very good resistance to impacts, and an excellent surface appearance. All these properties are obtained at melting temperatures as low as 120–130° C.

Moreover, the compositions in accordance with the invention are very stable on storage.

Conversely, an amorphous polyester carrying end methacryloyl groups which is formulated without semi-crystalline polyester carrying these same groups, such as the comparison compositions (e), (g), (k) and (n), provide coatings with a mediocre visual appearance and a mediocre flexibility (direct and reverse impact). In addition, the comparison composition (d) is not stable on storage.

On comparing the composition (k) (comparative) with the compositions (i) and (j) (according to the invention), it is also seen that the use of a semi-crystalline polyester carrying end methacryloyl groups, together with an amorphous polyester carrying end methacryloyl groups which has a high content of isophthalic acid (Example 7), improves the flexibility (resistance to direct and reverse impact) as well as the appearance and the resistance to solvents.

It is also seen, on comparing the compositions (c) and (h) with the compositions (m) and (l) respectively, that the use of a dicarboxylic acid with ethylenic unsaturation, such as fumaric acid, for the synthesis of the amorphous polyester containing end methacryloyl groups, improves the pencil hardness and the resistance to solvents. Such compositions (see also the composition (n)) give properties which are in every respect noteworthy to the coatings which they make it possible to prepare (very good flexibility, hardness, resistance to solvents and very good appearance).

The benefit of the compositions in accordance with the invention is thus clear.

In addition, comparison of the composition (p) according to the invention with the composition (q) (comparative) shows the necessity for the presence of end methacryloyl groups in order to obtain coatings having good properties (the amorphous polyester of Example 11 entering into the composition (q) contains only ethylenic unsaturations in the chain).

TABLE II

| Composition | Formulation | Semi-crystalline polyester: No. of the example and amount | Amorphous polyester: No. of the example and amount | Resistance, direct impact | Resistance, reverse impact | Pencil hardness | MEK rubs | Visual assessment | Stability on storage |
| --- | --- | --- | --- | --- | --- | --- | --- | --- | --- |
| (a) | A | Example 1 30 | Example 3 70 | 180 | 180 | H | >100 | good | 5, 4, 3, 3+ |
| (b) | A | Example 2 15 | Example 3 85 | 180 | 180 | H | >100 | good | 5, 4, 3, 3+ |
| (c) | B | Example 2 15 | Example 3 85 | 140 | 140 | H | >100 | good | 5, 4, 3, 3+ |
| (d)* | A | — | Example 4 100 | 160 | 140 | HB | >100 | medium | 3, 2, 2, 0-- |
| (e)* | C | — | Example 3 100 | 20 | 0 | H | 40 | medium | 5, 4, 4, 3+ |
| (f) | C | Example 5 | Example 3 | 180 | 180 | H | >100 | good | 5, 4, 4, 3+ |

TABLE II-continued

| Composition | Formulation | Semi-crystalline polyester: No. of the example and amount | Amorphous polyester: No. of the example and amount | Resistance, direct impact | Resistance, reverse impact | Pencil hardness | MEK rubs | Visual assessment | Stability on storage |
|---|---|---|---|---|---|---|---|---|---|
| (g)* | C | — | Example 10 100 | 60 | 40 | H | 50 | medium | 4, 4, 3, 3+ |
| (h) | C | Example 6 15 | Example 10 85 | 180 | 160 | H | >100 | good | 4, 4, 3, 3+ |
| (i) | A | Example 2 30 | Example 7 70 | 180 | 180 | H | >100 | good | 5, 4, 3, 3+ |
| (j) | A | Example 6 30 | Example 7 70 | 200 | 200 | H | >100 | good | 5, 4, 3, 3+ |
| (k)* | A | — | Example 7 100 | 0 | 0 | H | 80 | medium | 5, 4, 4, 3+ |
| (l) | C | Example 6 20 | Example 8 80 | 200 | 200 | 2H | >200 | good | 5, 4, 4, 3+ |
| (m) | A | Example 2 20 | Example 9 80 | 160 | 140 | 3H | >200 | good | 5, 4, 4, 3+ |
| (n)* | C | — | Example 8 100 | 40 | 20 | 2H | >100 | medium | 5, 4, 4, 3+ |
| (o) | C | Example 12 20 | Example 3 80 | 200 | 200 | H | 200 | good | 5, 4, 4, 3+ |
| (p) | A | Example 6 10 | Example 9 90 | 100 | 80 | 3H | >200 | good | 4, 4, 4, 3+− |
| (q)* | A | Example 6 10 | Example 11 90 | 20 | 20 | H | >100 | medium | 4, 4, 3, 3+− |

*The compositions (d), (e), (g), (k), (n) and (q), indicated by *, are tested by way of comparison

What is claimed is:

1. A radiation-curable powder composition, comprising a mixture of at least one semi-crystalline polyester containing end methacryloyl groups and of at least one amorphous polyester containing end methacryloyl groups, said amorphous polyester containing end methacryloyl groups having a degree of end methacrylic unsaturation of 0.17 to 1.5 milliequivalents of double bonds per gram of polyester, these polyesters comprising the reaction products of a glycidyl methacrylate and of a semi-crystalline or amorphous polyester containing end carboxyl groups, the said semi-crystalline polyester containing end carboxyl groups representing (a) a polyester which is the reaction product of
      (1) an acid constituent which contains (a.1.1) 85 to 100 mol % of terephthalic acid, of 1,4-cyclohexanedicarboxylic acid or of 1,12-dodecanedioic acid and (a.1.2) 0 to 15 mol % of at least one other aliphatic, cycloaliphatic or aromatic di- or polycarboxylic acid having from 4 to 14 carbon atoms; and
      (2) an alcohol constituent which contains (a.2.1) 85 to 100 mol % of a saturated, straight-chain, aliphatic diol having from 2 to 12 carbon atoms and (a.2.2) 0 to 15 mol % of at least one other aliphatic or cycloaliphatic di- or polyol having from 2 to 15 carbon atoms; or
   (b) a polyester which is the reaction product of
      (1) an acid constituent which contains (b.1.1.) 85 to 100 mol % of a saturated, straight-chain, aliphatic dicarboxylic acid having from 4 to 14 carbon atoms and (b.1.2) 0 to 15 mol % of at least one other aliphatic, cycloaliphatic or aromatic di- or polycarboxylic acid having from 4 to 14 carbon atoms, and
      (2) an alcohol constituent which contains (b.2.1.) 85 to 100 mol % of 1,4-cyclohexanediol or of 1,4-cyclohexanedimethanol and (b.2.2) 0 to 15 mol % of at least one other aliphatic or cycloaliphatic di- or polyol having from 2 to 15 carbon atoms;

and the said amorphous polyester containing end carboxyl groups being composed of the (c) reaction product of
      (1) an acid constituent which contains (c.1.1.) 40 to 100 mol % of terephthalic acid or of isophthalic acid and (c.1.2) 0 to 60 mol % of another aliphatic, cycloaliphatic or aromatic di- or polycarboxylic acid having from 4 to 14 carbon atoms, with
      (2) an alcohol constituent which contains (c.2.1) 35 to 100 mol % of neopentyl glycol and (c.2.2) 0 to 65 mol % of another aliphatic or cycloaliphatic di- or polyol having from 2 to 15 carbon atoms.

2. A composition according to claim 1, wherein the said amorphous polyester containing end carboxyl groups (c) is composed of the reaction product of
   (1) an acid constituent which contains (c.1.1) 80 to 100 mol % of terephthalic acid or of isophthalic acid and (c.1.2) 0 to 20 mol % of another aliphatic, cycloaliphatic or aromatic di- or polycarboxylic acid having from 4 to 14 carbon atoms, with
   (2) an alcohol constituent which contains (c.2.1) 60 to 100 mol % of neopentyl glycol and (c.2.2) 0 to 40 mol % of another aliphatic or cycloaliphatic di- or polyol having from 2 to 15 carbon atoms.

3. A composition according to claim 1, wherein the di- or polycarboxylic acid (a.1.2) represents maleic acid, fumaric acid, isophthalic acid, phthalic acid, terephthalic acid, 1,2-cyclohexanedicarboxylic acid, 1,3-cyclohexanedicarboxylic acid, 1,4-cyclohexanedicarboxylic acid, succinic acid, glutaric acid, adipic acid, pimelic acid, suberic acid, azelaic acid, sebacic acid, trimellitic acid, pyromellitic acid or their anhydrides, alone or as a mixture.

4. A composition according to claim 1, wherein the saturated, straight-chain, aliphatic diol (a.2.1) represents ethylene glycol, 1,4-butanediol, 1,5-pentanediol or 1,6 hexanediol.

5. A composition according to claim 1, wherein the aliphatic or cycloaliphatic di- or polyol (a.2.2) represents 1,4-cyclohexanediol, 1,4-cyclohexanedimethanol, hydrogenated bisphenol A, trimethylolpropane, ditrimethylolpropane, trimethylolethane, pentaerythritol or their mixtures.

6. A composition according to claim 1, wherein the saturated, straight-chain, aliphatic dicarboxylic acid (b.1.1) represents succinic acid, glutaric acid, adipic acid, pimelic acid, suberic acid, azelaic acid, sebacic acid, 1,12-dodecanedioic acid or their anhydrides, alone or as a mixture.

7. A composition according to claim 1, wherein the di- or polycarboxylic acid (b.1.2) represents maleic acid, fumaric acid, phthalic acid, terephthalic acid, isophthalic acid, 1,2-cyclohexanedicarboxylic acid, 1,3-cyclohexanedicarboxylic acid, 1-4-cyclohexanedicarboxylic acid, trimellitic acid, pyromellitic acid or their anhydrides, alone or as a mixture.

8. A composition according to claim 1, wherein the aliphatic or cycloaliphatic di- or polyol (b.2.2) represents ethylene glycol, propylene glycol, 1,4-butanediol, 1,5-pentanediol, 1,6-hexanediol, 1,4-cyclohexanediol, 1,4-cyclohexanedimethanol, hydrogenated bisphenol A, trimethylolpropane, ditrimethylolpropane, trimethylolethane, pentaerythritol or their mixtures.

9. A composition according to claim 1, wherein the said semi-crystalline polyester containing end methacryloyl groups exhibits a degree of end unsaturation of 0.17 to 2.0 milliequivalents of double bonds per gram of polyester.

10. A composition according to claim 1, wherein the said semi-crystalline polyester containing end methacryloyl groups has a number-average molecular weight of 1000 to 20,000.

11. A composition according to claim 1, wherein the said semi-crystalline polyester containing end methacryloyl groups exhibits a melting temperature of 60 to 150° C.

12. A composition according to claim 1, wherein the aliphatic, cycloaliphatic or aromatic di- or polycarboxylic acid having from 4 to 14 carbon atoms (c.1.2) represents maleic acid, fumaric acid, tetrahydrophthalic acid, isophthalic acid, phthalic acid, terephthalic acid, 1,2-cyclohexanedicarboxylic acid, 1,3-cyclohexanedicarboxylic acid, 1,4-cyclohexanedicarboxylic acid, succinic acid, glutaric acid, adipic acid, pimelic acid, suberic acid, azelaic acid, sebacic acid, trimellitic acid, pyromellitic acid or their anhydrides, alone or as a mixture.

13. A composition according to claim 1, wherein the aliphatic or cycloaliphatic di- or polyol having from 2 to 15 carbon atoms (c.2.2) represents ethylene glycol, diethylene glycol, propylene glycol, 1,4-butanediol, 1,6-hexanediol, 1,4-cyclohexanedimethanol, 2-methyl-1,3-propanediol, hydrogenated bisphenol A, neopentyl glycol hydroxypivalate, trimethylolpropane, ditrimethylolpropane, trimethylolethane, pentaerythritol or their mixtures.

14. A composition according to claim 1, wherein the said amorphous polymer containing end methacryloyl groups exhibits a degree of ethylenic unsaturation in the chain of the polyester of 0 to 3.5 milliequivalents of double bonds per gram of polyester.

15. A composition according to claim 1, wherein the amorphous polyester containing end methacryloyl groups exhibits a functionality of 2 to 4.

16. A composition according to claim 1, wherein the amorphous polyester containing end methacryloyl groups has a number-average molecular weight of 1100 to 9000.

17. A composition according to claim 1, wherein the amorphous polyester containing end methacryloyl groups exhibits a glass transition temperature ranging from 45 to 80° C.

18. A composition according to claim 1, wherein the mixture of the polyesters contains 5 to 50 parts by weight of the semi-crystalline polyester containing end methacryloyl groups and 50 to 95 parts by weight of the amorphous polyester containing end methacryloyl groups, with respect to the total weight of the polyesters.

19. A composition according to claim 1, wherein the glycidyl methacrylate represents glycidyl methacrylate or β-methylglycidyl methacrylate.

20. A composition according to claim 1, wherein it is devoid of crosslinking agent and of catalyst.

21. A composition according to claim 1, wherein it additionally comprises an ethylenically unsaturated oligomer.

22. A composition according to claim 21, wherein the ethylenically unsaturated oligomer is the triacrylate or the trimethacrylate of tris(2-hydroxyethyl)isocyanurate.

23. A composition according to claim 21, wherein it comprises per 100 parts by weight, up to 20 parts by weight of the ethylenically unsaturated oligomer.

24. A composition curable by ultraviolet irradiation according to claim 1, wherein it additionally comprises a photoinitiator, or a photoinitiator and a photoactivator.

25. A composition according to claim 24, wherein it comprises, per 100 parts by weight, up to 15 parts by weight of photoinitiator.

26. A process for coating an article, wherein a radiation-curable powder composition according to claim 1 is applied to the said article by deposition by spraying with a triboelectric or electrostatic gun or by deposition in a fluidized bed, in that the coating thus obtained is caused to melt by heating at a temperature of 100 to 150° C. for a time of approximately 1 to 5 minutes and in that the said coating in the molten state is then exposed to ultraviolet radiation or to accelerated electron beams for a time which is sufficient to form a cured coating.

27. A powder varnish or paint curable by irradiation with an accelerated electron beam, obtained from a composition according to claim 1.

28. A powder varnish or paint curable by ultraviolet irradiation, obtained from a composition according to claim 1.

29. An article coated entirely or partially with a varnish and/or a paint according to claim 27.

30. An article coated entirely or partially with a varnish and/or a paint according to claim 28.

31. A composition according to claim 1, wherein the said semi-crystalline polyester containing end methacryloyl groups exhibits a degree of end unsaturation of 0.35 to 1.50 milliequivalents of double bonds per gram of polyester.

32. A composition according to claim 1, wherein the said semi-crystalline polyester containing end methacryloyl groups has a number-average molecular weight of 1400 to 8500.

33. A composition according to claim 1, wherein the aliphatic, cycloaliphatic, or aromatic di- or polycarboxylic acid having from 4 to 14 carbon atoms (c.1.2) represents fumaric, maleic, or tetrahydrophthalic acid, alone or as a mixture.

34. A composition according to claim 1, wherein the said amorphous polyester containing end methacryloyl groups exhibits a degree of end methacrylic unsaturation of 0.35 to 1.25 milliequivalents of double bonds per gram of polyester.

35. A composition according to claim 1, wherein the said amorphous polymer containing end methacryloyl groups exhibits a degree of ethylenic unsaturation in the chain of the polyester of 0 to 1.0 milliequivalents of double bonds per gram of polyester.

36. A composition according to claim 1, wherein the amorphous polyester containing end methacryloyl groups has a number-average molecular weight of 1300 to 8500.

37. A composition according to claim 1, wherein the mixture of the polyesters contains 5 to 35 parts by weight of the semi-crystalline polyester containing end methacryloyl groups and 65 to 95 parts by weight of the amorphous polyester containing end methacryloyl groups, with respect to the total weight of the polyesters.

38. A composition according to claim 21, wherein the ethylenically unsaturated oligomer is the triacrylate of tris (2-hydroxyethyl)isocyanurate.

39. A composition according to claim 21, wherein it comprises, per 100 parts by weight, up to 10 parts by weight of the ethylenically unsaturated oligomer.

* * * * *